United States Patent

Veghte et al.

[11] Patent Number: 5,845,293
[45] Date of Patent: Dec. 1, 1998

[54] METHOD AND SYSTEM OF ASSOCIATING, SYNCHRONIZING AND RECONCILING COMPUTER FILES IN AN OPERATING SYSTEM

[75] Inventors: William Lewis Veghte, Belleuve; Andrew Lawrence Silverman, Redmond; Shannon Scott Hysom, Mercer Island; David R. Dickman, Redmond, all of Wash.

[73] Assignee: Microsoft Corporation, Redmond, Wash.

[21] Appl. No.: 832,333

[22] Filed: Mar. 26, 1997

Related U.S. Application Data

[63] Continuation of Ser. No. 287,231, Aug. 8, 1994, abandoned.

[51] Int. Cl.[6] ................................................. G06F 17/30
[52] U.S. Cl. ........................................ 707/202; 707/203
[58] Field of Search ............................ 395/618, 619, 395/620; 709/201–204

[56] References Cited

U.S. PATENT DOCUMENTS

| | | | |
|---|---|---|---|
| 4,831,552 | 5/1989 | Scully et al. ............................ | 364/518 |
| 4,866,611 | 9/1989 | Cree et al. .............................. | 364/300 |
| 5,093,787 | 3/1992 | Simmons ................................ | 364/406 |
| 5,392,390 | 2/1995 | Crozier .................................... | 395/161 |
| 5,560,012 | 9/1996 | Ryu et al. ................................ | 395/701 |
| 5,564,051 | 10/1996 | Halliwell et al. ....................... | 395/616 |
| 5,581,764 | 12/1996 | Fitzgerald et al. ..................... | 395/703 |
| 5,600,834 | 2/1997 | Howard .................................. | 395/617 |
| 5,649,200 | 7/1997 | Leblang et al. ........................ | 395/703 |
| 5,666,530 | 9/1997 | Clark et al. ............................. | 395/617 |

OTHER PUBLICATIONS

Aker, S.Z., "FileRunner Shuttle Pilot, and Synchronize!" MacUser, vol. 9, No. 9 (Sep. 1993), pp. 89–91.
MacWeek Magazine, Jan. 11, 1993, "Sync or Swim: Applications Keep Current On File Synchronization", pp. 63–66.
Info. World Magazine, Feb. 1, 1993, "SmartSync: An Intelligent Disk Synchronization Utility for Windows", pp. 3–5.
MacWeek Magazine, Nov. 23, 1992, "PowerBooks Aplenty Pack Pipeline for '93", pp. 1 and 140.
MacWeek Magazine, Jan. 11, 1993, "Calling All Managers: Think Before You Sync", p. 47.

*Primary Examiner*—Maria N. Von Buhr
*Attorney, Agent, or Firm*—Jones & Askew, LLP

[57] ABSTRACT

A method and system for associating, synchronizing and reconciling files. Associated files are synchronized and their synchronization status reported. Based on the synchronization status, the operating system recommends a preferred reconciliation action. Furthermore, file conflicts are recognized and an application interface for computer applications is provided to allow conflicting files to be merged.

23 Claims, 12 Drawing Sheets

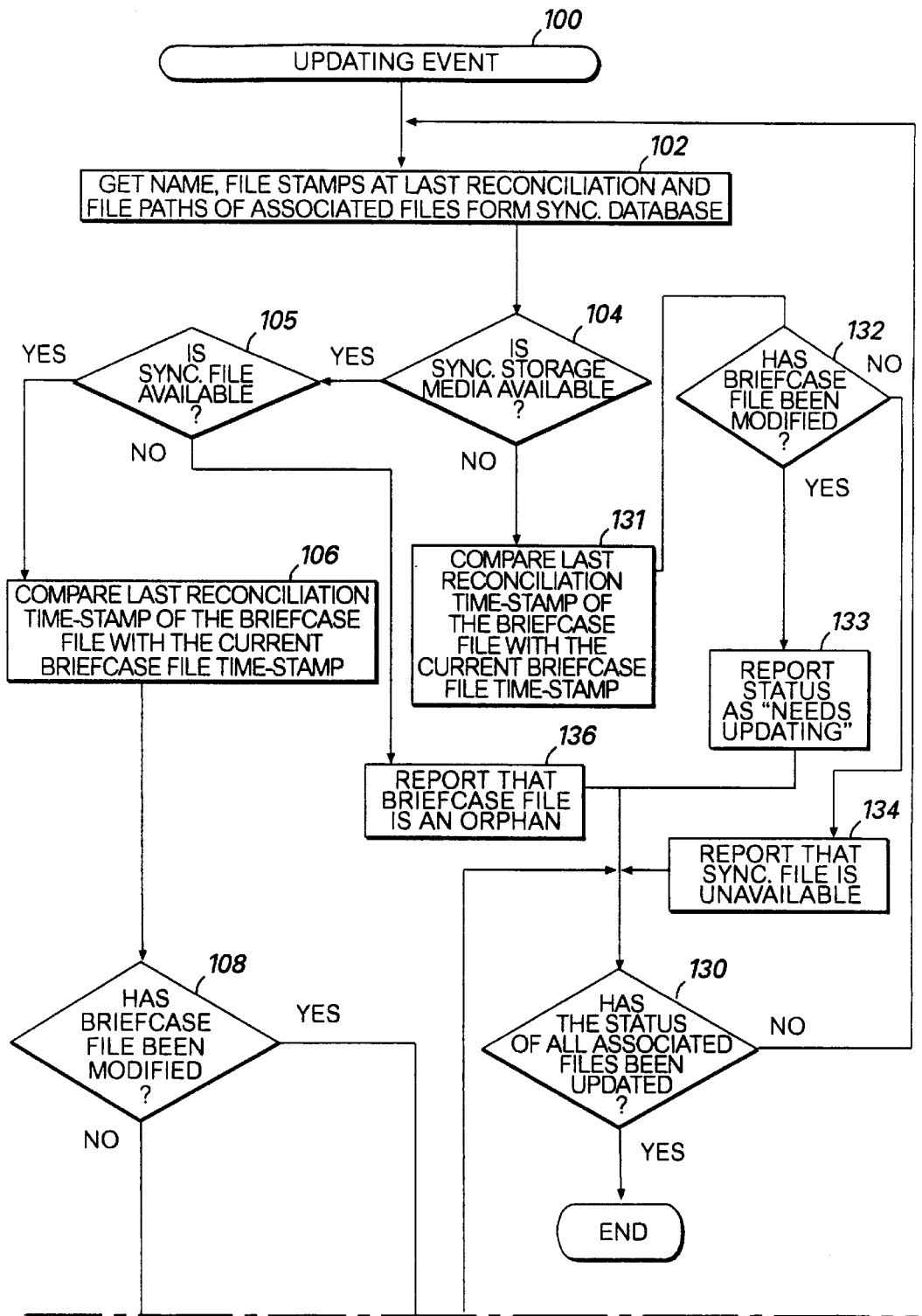
FIG.5A    MATCH LINE TO FIG. 5B

METHOD AND SYSTEM OF ASSOCIATING, SYNCHRONIZING AND RECONCILING COMPUTER FILES IN AN OPERATING SYSTEM

This is a continuation of application Ser. No.08/287, 231 filed Aug. 8, 1994, now abandoned.

TECHNICAL FIELD

The present invention relates generally to operating systems for computing devices, and more particularly to an improved system for, and method of, associating, synchronizing and reconciling computer files in an operating system.

BACKGROUND OF THE INVENTION

From the late 1970s through the present day the ability of general purpose digital computing devices to perform a wide variety of tasks has continually expanded. As a result, the use of personal computers has proliferated in businesses, homes, academia, and a multitude of other environments. Further, due to more recent advances in technology, the use of compact portable computers for travel has become feasible and even common-place.

Today, as the proliferation of personal computers continues, individuals routinely use more than a single computer in their work. This allows computer files to be created at one location and transferred to a computer at another location for modification there. As used herein the term "file" means a computer document created from a computer application or a folder containing such computer documents. The term "transfer" means to copy a file from one folder to another. The copied file may reside on the same computer or on separate computers.

Individuals typically use a second computer to engage in after-hours employment related work. These users have a computer at their home in addition to one at their office, and perhaps even a portable computer for travel. Thus, they can create a file at the office, transfer the file from their office computer to their home computer, and modify the file at home. On the succeeding business day, the users may transfer the modified file back to their office computer for further use there. Additionally, for travel, many users transfer files to a portable computer for use or modification while traveling.

Most businesses have multiple computers, with secretaries as well as engineers, researchers and managers typically having their own office computer. These computers are often networked together in order to allow files to be easily transferred between employees. Pile transfer may be further facilitated by using a central file server in connection with a network. Central servers contain often used files, such as standard business forms, thereby allowing employees to easily access and transfer needed files to their respective computers for use and modification there.

The increasing use of multiple computers and networked systems by single entities has led to an increase in the transfer of files between or among that entity's computers. A problem associated with file transfer between computers is the resulting creation of multiple file versions when the transferred file copy or the original file copy is later modified. Thus, two file versions exist for each file that is transferred to, and modified on, another computer. Multiple file versions cause confusion as to whether a particular file copy is the up-to-date version. Such confusion can lead to the use of an outdated file version.

In a network environment, for example, an original document, such as a letter, may be typed and saved by a secretary at his or her computer. The letter then may be transferred over the network to the originator's computer for review. The originator can then rough edit and store the letter on his or her computer. Thus, a second version of the letter is created and stored on the originator's computer. When satisfied with this second version, the originator may print out a hard copy of the letter for review by a third person. The third person may perform a final edit by marking-up the printed copy. The marked-up copy is then given to the secretary for entry of those marked changes. If the secretary adds the marked changes to the original version on his or her computer, the final letter will be incorrect. It will not incorporate the originator's rough edit changes. Therefore, when modifying a file, a secretary must either insure he or she has the up-to-date file version by manually checking the copies that were transferred to other computers, or risk using an outdated file version.

The problem of multiple file versions also exists where files are transferred from central servers to individual employee computers. For example, where salesmen copy a standard price list, the file versions on the individual computers will become increasingly outdated as the standard price list is periodically updated. Thus, one salesman's price list may be two weeks old, while another's is one week old, and a third's is up-to-date. This can result in incorrect and conflicting information being used by a business.

In the absence of a network between computers, as is usually the case with a user's home and office computers, files are often transferred between the computers by a "sneaker-net". In a sneaker-net, a user "networks" its home and office computers by physically transporting files back and forth on storage media. As used herein the phrase "storage media" means a device capable of storing information in a format readable by a computer. The phrase "removable storage media" means a storage media device that is readily insertable and removable from a computer. Typically in a sneaker-net, a removable storage media, such as a floppy disk is used. Increasingly, however, portable computers are used as a means of transporting files in a sneaker-net environment. The use of a portable computer allows files to be transferred between the transporting storage media, the portable computer's hard disk drive, and the user's home or office computer more quickly over a local connection than can be done with removable storage media. The phrase "local connection" means a connection between computers in close proximity over which files or other information may be transferred. For example, the connection may be by serial or parallel cable. Further, the connection may be wireless using infrared or RF (radio frequency). Sneaker-net environments also lead to multiple file versions because files are transferred and modified on separate computers.

While the problem of multiple file versions may be alleviated by manually and continually updating older file versions when newer ones are created, that solution is impractical. Users typically create and edit multiple documents from various directories contemporaneously with one another. Thus, they cannot always remember what file versions in which directories are the most up-to-date. Further still, a user may be unaware that a newer version of a file even exists, such as when a standard form on a central server has been updated by management.

A second problem associated with file transfers between computers is resulting file conflicts. For example, a file conflict occurs when a single user independently modifies two separate versions of the same file. File conflicts also occur when two users, each with his or her own copy of the same file, such as a proposal, independently modify his or her own copy and thus create two "latest" versions of that file. Conflicting file versions cannot be readily reconciled because neither version incorporates the modifications of both users. In such cases, a version containing the modifications of both users can only be created by merging the two versions.

Therefore, there exists a need for a method and system for associating, synchronizing and reconciling files in a computer system. As used herein, the term "associate" means to link two or more files for synchronization. The term "synchronize" means to determine whether associated files are up-to-date and, if they are not, to recommend a preferred reconciliation action. "Reconciliation" is the act of updating or merging associated files. As used herein the term "updating" means replacing outdated file versions with an up-to-date file version. The term "outdated" means that the file has not been modified since the last reconciliation action and an associated file has been modified. The term "up-to-date" means that the file represents the latest version available, which further means that either the file has been modified since the last reconciliation action and its associated files have not been modified, that neither the file nor its associated files have been modified since the last reconciliation action or that an associated file is not available for synchronization.

The association method and system should be user friendly, allowing users to intuitively associate files. Synchronization should automatically determine the status of associated files, report existing file conflicts and recommend proper reconciliation actions. The method and system should be able to function in both network and sneaker-net environments. Further, the method and system should provide an application interface to allow applications to merge files of their own type when file conflicts occur. Further still, file association and synchronization should operate as part of a computer operating system so that a separate application does not need to be launched.

Various methods have been used in the prior art for file association, synchronization and reconciliation. The earliest methods used a synchronization relationship to periodically back-up a computer's secondary memory. Back-up relationships, however, are only one way in nature, from a first computer to a second computer. Thus, such back-up synchronization methods are only designed for situations where files are created and modified on only one computer. As such, back-up relationships do not fulfill the present need because often files are modified on separate computers. Thus, back-up methods do not solve the need for a method and system for associating, synchronizing and reconciling files that are modified on different computers.

More recently, various other methods of associating, synchronizing and reconciling files have been used. These methods, however, do not provide an intuitive method of file association and synchronization in both a network and a sneaker-net environment. Further, the prior art methods do not provide for adequate reconciliation because they do not include an application interface for merging conflicting files. Moreover, because the prior art methods are not seamlessly integrated into an operating system, user interface or shell, they must be separately launched.

Thus, there exists a need for a method and system for intuitively associating, synchronizing and reconciling computer files. Further, there exists a need for an associating, synchronizing and reconciling method and system that will interface with computer applications in order to allow conflicting files to be merged.

SUMMARY OF THE INVENTION

The present invention provides a better solution to solving the problems in the art described above by providing an intuitive method and system for associating files. Associated files are synchronized and their synchronization status reported. On the basis of synchronization status, the present invention recommends a preferred reconciliation action. Furthermore, file conflicts are recognized and an application interface is provided in order to allow applications to merge conflicting files.

Generally described, the present invention is a method and system for associating, synchronizing and reconciling files using a database dedicated to storing file association information. The information stored includes the name, paths, and last reconciliation time-stamps of associated files. Upon the occurrence of selected updating events, such as a user request, the present invention retrieves the database information and uses the name and paths to get the current time-stamps of the associated files. With that information, the present invention determines whether reconciliation actions are needed for an associated file set by comparing the current time-stamps of the associated files with each file's last reconciliation time-stamp stored in the database.

Where none of the files of an associated file set have been modified or when only one of the associated files is available, the present invention reports the synchronization status as up-to-date. If only one associated file has been modified, the present invention reports that the unmodified files needs updating and recommends replacing the unmodified files with the modified file. Where two or more associated files have been modified, the present invention determines whether a reconciliation handler is available for that file type. If a reconciliation handler is available, the present invention recommends that the modified files be merged and the resulting up-to-date file be used to replace the associated files. If a reconciliation handler is not available, the present invention informs the user of the existing file conflict.

In one embodiment of the present invention, files are selected for association by transferring them into a dedicated folder (referred to as a "briefcase"). In this embodiment, each such dedicated folder has a dedicated synchronization database for storing file association information.

In a second embodiment of the present invention, files are selected for association (referred to as "twinning") by selecting the association during the initial file transfer. For this embodiment, a global synchronization database is used to store file association information relating to the twinned files.

Thus, it is an object of the present invention to provide an improved method and system for associating, synchronizing and reconciling files.

It is a further object of the present invention to provide a method and system that allow a computer user to associate files intuitively.

It is a further object of the present invention to provide an application interface for merging conflicting files.

It is a further object of the present invention to provide an operating system for associating, synchronizing and reconciling files.

Further objects, features and advantages of the present invention will become apparent upon reviewing the follow-

DETAILED DESCRIPTION

Figure 1A:
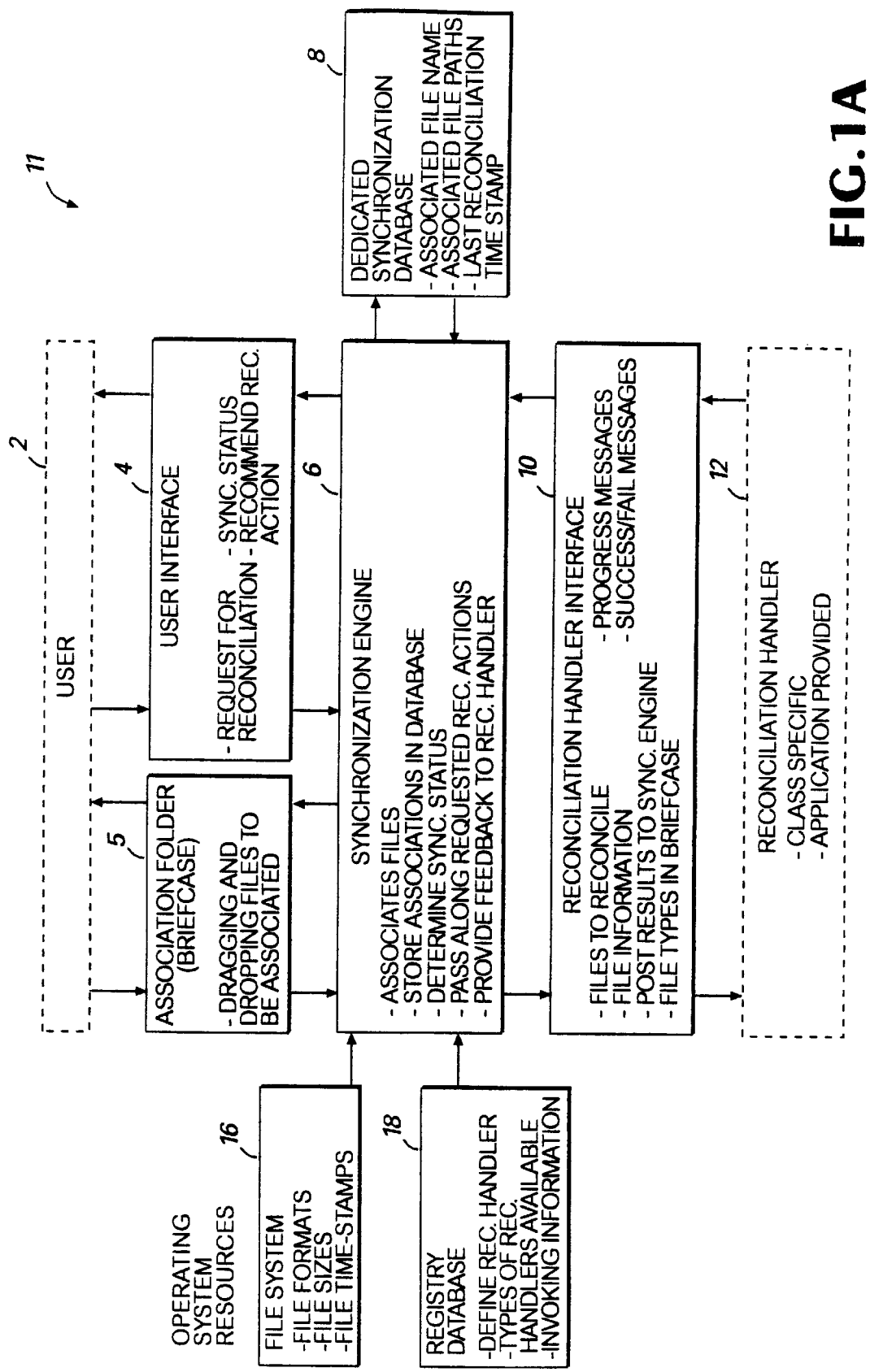
FIG. 1A is a diagrammatic view of the operating system components used in connection with a first embodiment (briefcase) for associating, synchronizing and reconciling files in accordance with the present invention.
Figure 1B:
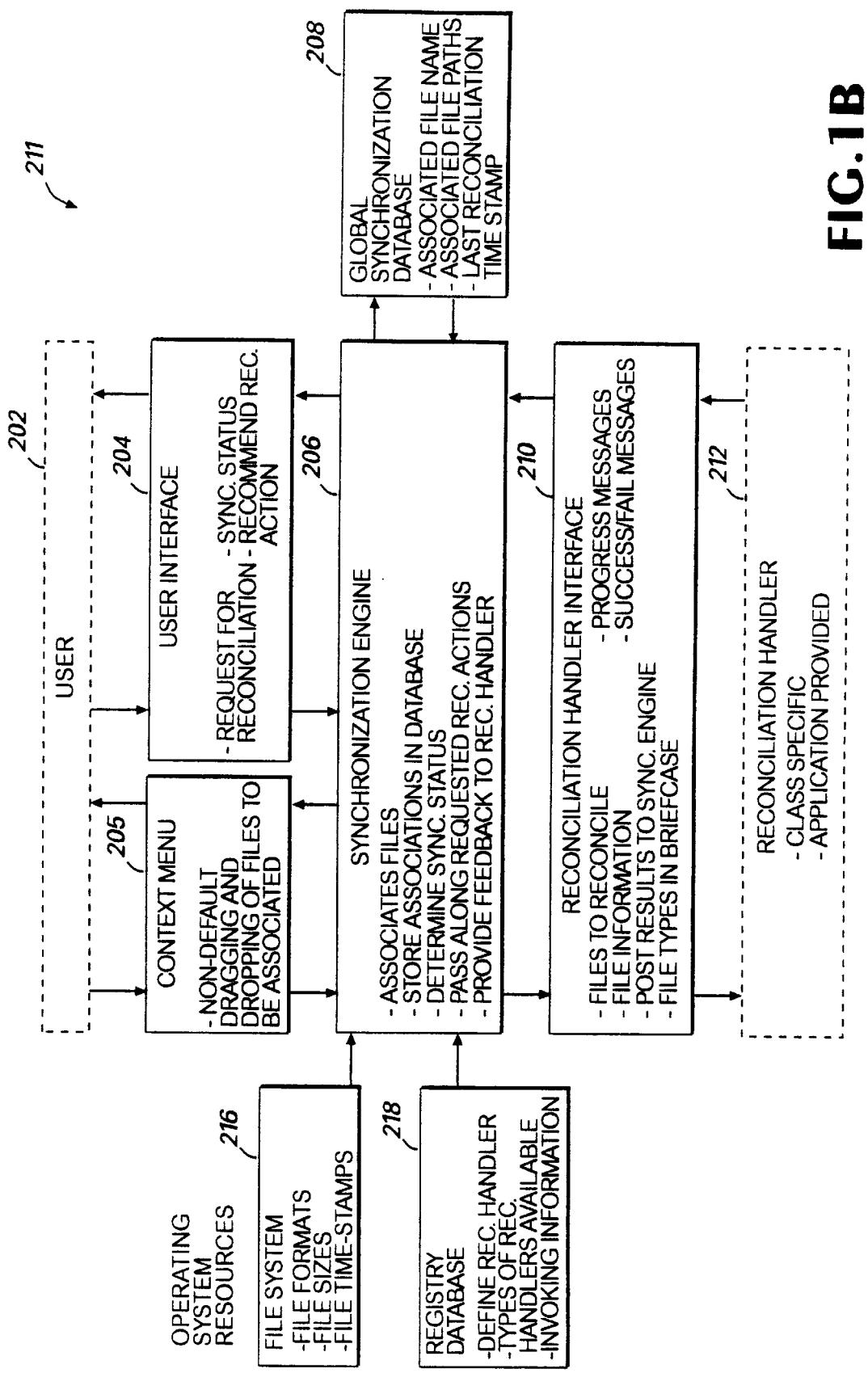
FIG. 1B is a diagrammatic view of the operating system components used in connection with a second embodiment (twinning) for associating, synchronizing and reconciling files in accordance with the present invention.
Figure 2:
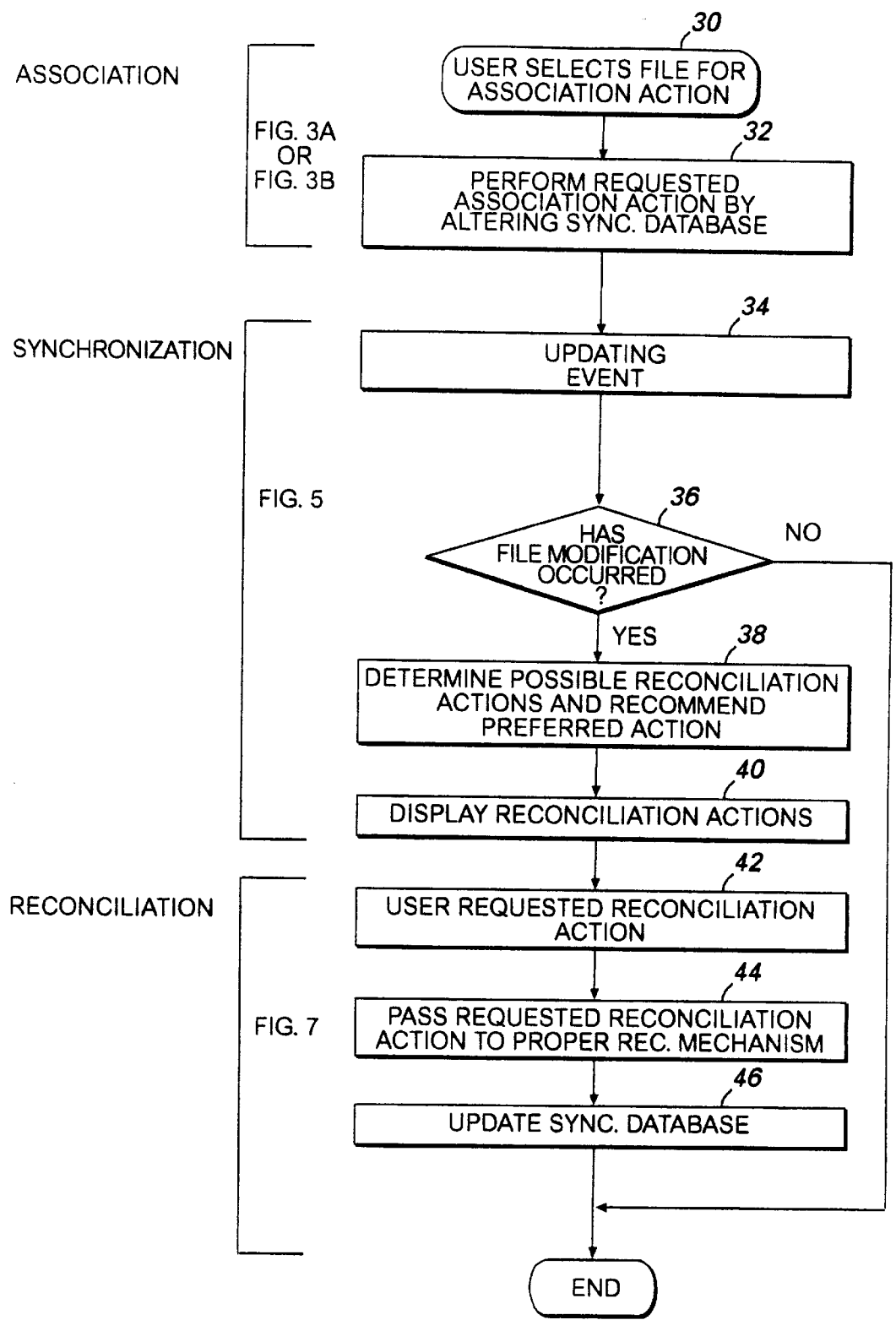
FIG. 2 is a high level logical flow diagram breaking down the method of the present invention into the basic components of file association, synchronization and reconciliation.
Figure 3A:
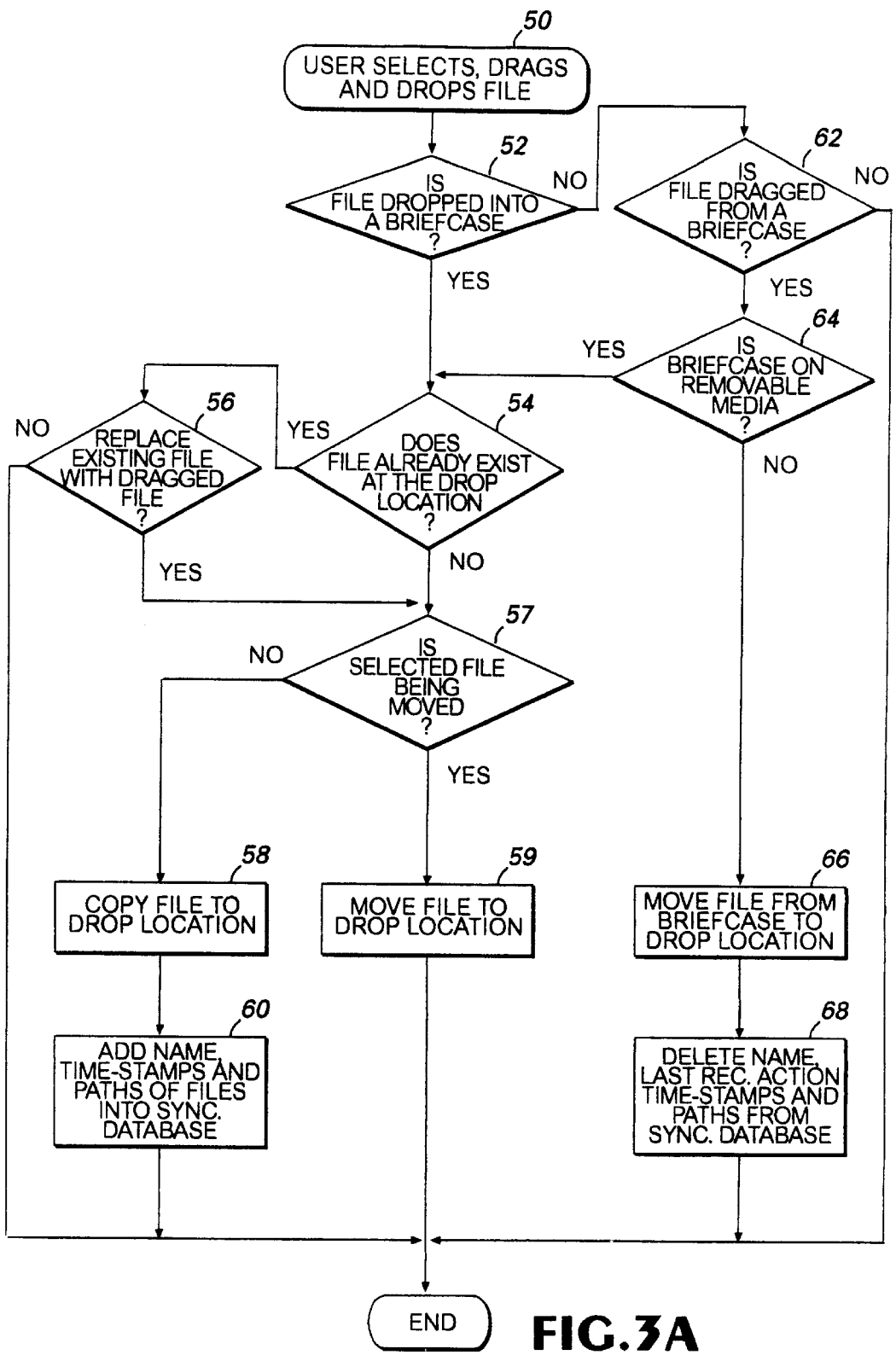
FIG. 3A is a logical flow diagram of the association component of FIG. 2 which incorporates a dedicated folder for associating files in accordance with the first embodiment (briefcase) of the present invention.
Figure 3B:
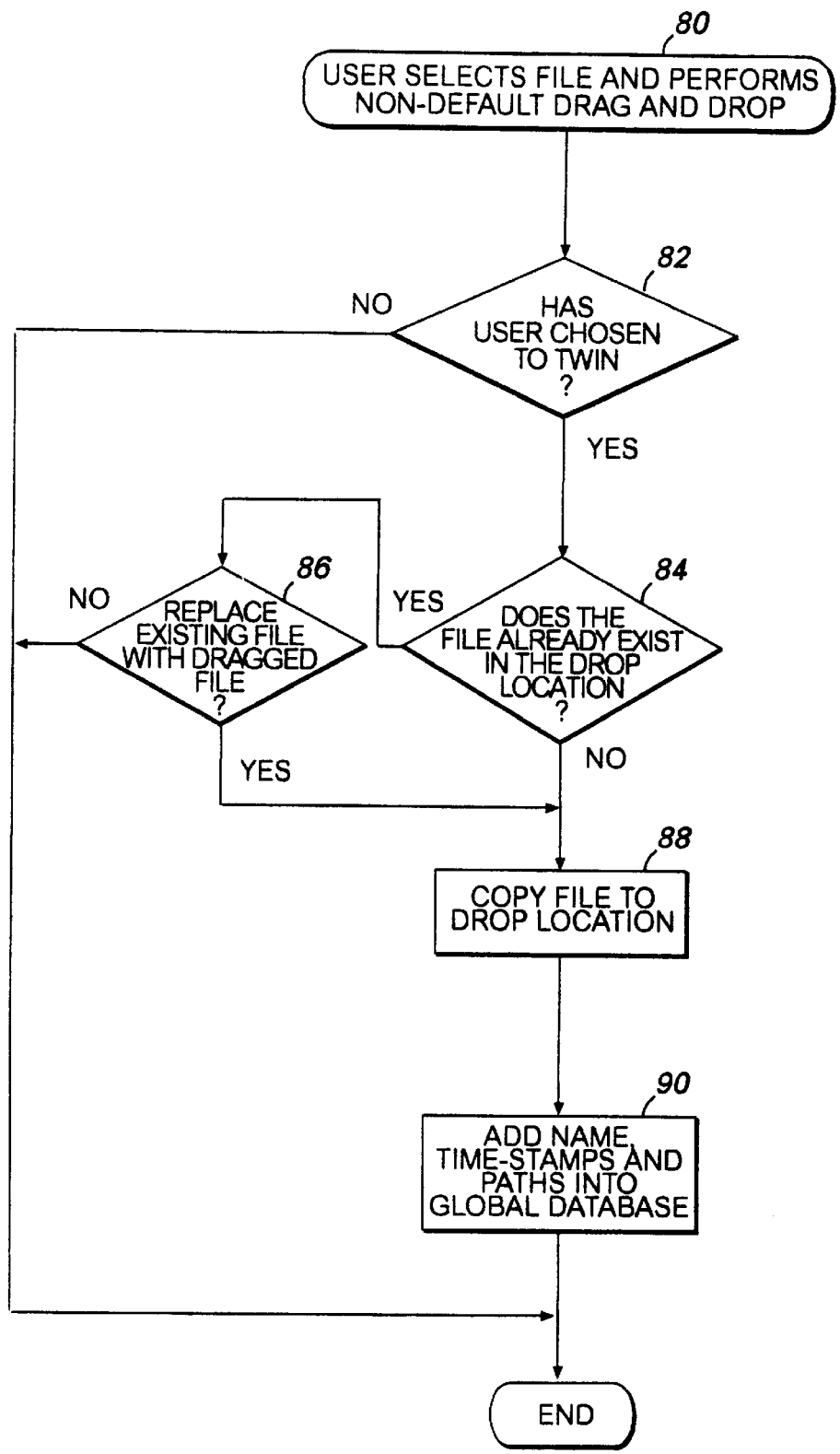
FIG. 3B is a logical flow diagram of the association component of FIG. 2 which incorporates a file transfer context menu for file association in accordance with the second embodiment (twinning) of the present invention.

Referring now in more detail to the drawings, in which like numerals refer to like parts throughout the several views, FIGS. 1–3 show the operating system components and method for associating, synchronizing and reconciling files in accordance with the present invention. FIGS. 1A and 3A show the first embodiment (briefcase) of the present invention by which files are associated. FIGS. 1B and 3B show the second file association embodiment (twinning).

This invention will be described with specific reference to an operating system method for associating, synchronizing and reconciling files. However, this invention should be also understood as applicable to module or other type programs that hook, interface or otherwise coordinate with an operating system to carry out the method of the present invention. Further, this invention will be described with specific reference to an operating system having a graphical user interface. However, this invention should be also understood as applicable to operating systems with a character based user interface.

With respect to the first association embodiment, FIG. 1A shows a functional block diagram of the components of a computer operating system 11 that are used for carrying out the present invention of associating, synchronizing and reconciling files. FIG. 2 shows the method of the present invention in conjunction with the components of operating system 11. A user 2 requests association actions via a user interface 4 at step 30. A synchronization engine 6 provides the mechanisms for associating, synchronizing and reconciling files. Files are associated by storing the information about them that is necessary to link them together into a dedicated synchronization database 8 at step 32. After an updating event at step 34, synchronization status is determined at decisional step 36. As used herein the phrase "synchronization status" means the status of an associated file set concerning the relative modification of its associated files. The phrase "file set" means two or more files associated in accordance with the present invention. Synchronization status is determined by comparing an associated file set's file information in the dedicated synchronization database 8 with its current file information that is retrieved from file system 16. On the basis of synchronization status, synchronization engine 6 recommends a preferred reconciliation action to user 2 at step 38. Next, at step 40, the preferred reconciliation action as well as other choices are displayed to user 2 through user interface 4.

If a file conflict exists between an associated file set, synchronization engine 6 determines if a reconciliation handler 12 of the proper file type is available to merge the associated file set. If a reconciliation handler 12 is available, synchronization engine 6 will display a merge request at step 40. If a proper reconciliation handler 12 is not available, synchronization engine 6 will not allow the user to request or initiate a merger. This is done by disallowing the merge selection in the user interface 4.

Although synchronization engine 6 could automatically perform the preferred reconciliation action, in the preferred embodiment, user 2 makes the final decision concerning what reconciliation action will be performed by requesting that action at step 42. Thus, the user 2 may override the recommended reconciliation action and select a different reconciliation action from the choices presented by the synchronization engine 6.

User requested reconciliation actions are received by the synchronization engine 6 and are passed to the proper reconciliation mechanism at step 44. The proper reconciliation mechanism for replacing an outdated file version with an updated file version is the file manager (not shown) of operating system 11. For merging files, the proper reconciliation mechanism is the reconciliation handler interface 10. After a requested reconciliation action is completed, the information concerning the associated file set in the dedicated synchronization database 8 is updated at step 46 for the file set that was reconciled.

FIG. 3A shows the method of the first embodiment for associating files in a computer operating system 11 having components and methods as shown in FIGS. 1A and 2. This embodiment shown in FIG. 3A has a dedicated folder 5 (briefcase) for associating files.

The inventive method of the first embodiment shown in FIG. 3A begins with user 2 selecting a file and dragging and dropping it into another folder at step 50. At this point decisions, based on the folder that the selected file is dragged to or from, determine whether a file association will be created or deleted. At decisional step 52, the operating system 11 determines whether the selected file was dropped into the dedicated folder 5 (briefcase). If the selected file was dropped into the dedicated folder 5, the YES branch is taken from step 52. Proceeding along the YES branch from step 52, decisional step 54 is performed to determine if a file of the same name already exists at the drop location (briefcase). The YES branch of step 54 leads to decisional step 56 which gives the user 2 the option of replacing the previously existing file with the selected file. If the user chooses not to replace the previously existing file at step 56, the NO branch of step 56 leads to the "end", the transfer is aborted and no association action occurs with respect to the selected file.

If user 2 chooses to replace the previously existing file in the drop location at step 56, the YES branch of step 56 leads to decisional step 57 which is performed to determine whether the selected file is being moved or copied to the drop location (briefcase). If the selected file is being moved, the YES branch of step 57 leads to step 59. At step 59, the selected file is moved to the drop location as an orphan. As used herein, the term "orphan" means a file in the dedicated folder 5 (briefcase) that is not associated with another file.

If the selected file is copied to the briefcase, the NO branch of step 57 leads to step 58. At step 58, the selected file is copied to the drop location, which in this case, is the dedicated folder 5 (briefcase). Similarly, if a file having the same name as the selected file does not exist at the drop location at step 54, the YES branch is followed to step 58 where the selected file is copied to the drop location. The file copy in the dedicated folder 5 is hereinafter referred to as the "briefcase file". The file copy that remains outside the dedicated folder 5 is hereinafter referred to as the "synchronized file".

Next, at step 60 the briefcase file and the synchronized file are associated by storing the necessary information to link the files and to determine their synchronization status in the future. Particularly, at step 60, the name and paths of the briefcase file and the synchronized file are stored into the dedicated synchronization database 8. Also at step 60, the time-stamp of the briefcase file and the time-stamp of the synchronized file are stored into the dedicated synchronization database 8 as the last reconciliation time-stamps of the files.

If, back at step 52, the selected file was not dropped into the dedicated folder 5 (briefcase), then the NO branch of step 52 leads to decisional step 62 to determine if the selected file was dragged from the dedicated folder 5 (briefcase). If the selected file was not dragged from the dedicated folder 5 (briefcase), then the transfer is unrelated to file association, and is ignored by following the NO branch of step 62. If, however, the selected file was dragged from the dedicated folder 5 (briefcase), then the YES branch of step 62 leads to decisional step 64 to determine if the dedicated folder 5 (briefcase) is on a floppy disk or other such removable storage media.

Step 64 is included to provide file association in a sneaker-net environment where files are transported by removable storage media. If the dedicated folder 5 (briefcase) is on a removable storage media, then the YES branch of step 64 leads to decisional step 54 which leads to file association by following the YES path from step 54. Thus, where the dedicated folder 5 is on a floppy disk, a file dragged from the dedicated folder 5 becomes a synchronized file associated with the briefcase file in the dedicated folder 5 (briefcase). Whether the dedicated folder 5 (briefcase) is on removable storage media is determined from the attributes of the storage media's drive.

This allows user 2 to place a dedicated folder 5 (briefcase) on a floppy disk and with it synchronize files that are modified on separate computers. Thus, a briefcase file in a dedicated folder 5 (briefcase) that is on a floppy disk or other removable storage media may be associated with two synchronized files, the first on user's 2 office computer and the second on user's 2 home computer.

If the dedicated folder 5 (briefcase) at step 64 is not on a removable storage media, then the NO branch of step 64 leads to step 66 where a previously associated file set is disassociated. Particularly, at step 66, the selected file is moved to the drop location. Next, at step 68 the selected file name, its path, the path of its previously associated file, and the last reconciliation time-stamps are deleted from the dedicated synchronization database 8.

Figure 9A:
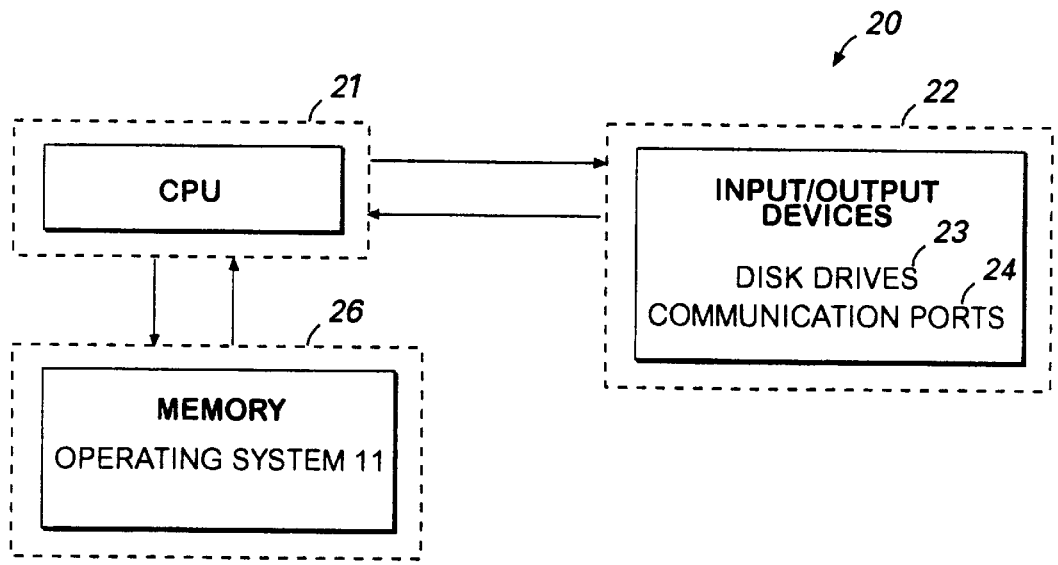
FIG. 9A is a diagrammatic view of the computing device used in connection with a first embodiment (briefcase) for associating, synchronizing and reconciling files in accordance with the present invention.

FIG. 9A shows the system of the first embodiment (briefcase) for associating files in computer operating system 11 having components and methods as shown in FIGS. 1A, 2 and 3A. Computing device 20 is operated by Central Processing Unit 21 (hereinafter "CPU"), which processes data from operating system 11. Operating system 11 resides in memory 26. CPU 21 additionally processes data from input/output devices 22, which may include disk drives for storage media 23 and/or communication ports 24.

With respect to the second embodiment, FIG. 1B shows a functional block diagram of the components of a computer operating system 211 that are used for carrying out the present invention of associating, synchronizing and reconciling files. FIG. 2 shows the method of the present invention in conjunction with the components of operating system 211. A user 202 requests association actions via a user interface 204 at step 30. A synchronization engine 206 provides the mechanisms for associating, synchronizing and reconciling files. Files are associated by storing the information about them that is necessary to link them together into a global synchronization database 208 at step 32. After an updating event at step 34, synchronization status is determined at decisional step 36. Synchronization status is determined by comparing an associated file set's file information in the global synchronization database 208 with its current file information that is retrieved from file system 216. On the basis of the synchronization status, synchronization engine 206 recommends a preferred reconciliation action to user 202 at step 38. Next, at step 40, the preferred reconciliation action as well as other choices are displayed to user 202 through user interface 204.

If a file conflict exists between an associated file set, synchronization engine 206 determines if a reconciliation handler 212 of the proper file type is available to merge the associated file set. If a reconciliation handler 212 is available, synchronization engine 206 will display a merge request at step 40. If a proper reconciliation handler 212 is not available, synchronization engine 206 will not allow the user to request a merger. This is done by disallowing the merge selection in the user interface 204.

Although synchronization engine 206 could automatically perform the preferred reconciliation action, in the preferred embodiment, user 202 makes the final decision concerning what reconciliation action will be performed by requesting that action at step 42. Thus, the user 202 may override the recommended reconciliation action and select a different reconciliation action from the choices presented.

User requested reconciliation actions received by the synchronization engine 206 are passed to the proper reconciliation mechanism at step 44. The proper reconciliation mechanism for replacing an outdated file version with an updated file version is the file manager of operating system 211. For merging files, the proper reconciliation mechanism is the reconciliation handler interface 210. After a requested reconciliation action is completed, the information concerning the associated file set in the global synchronization database 208 is updated at step 46 for the file set that was reconciled.

The second association embodiment for associating files in the present invention is shown in FIG. 3B and is described in connection with the same operating system components and methods as shown in FIGS. 1B and 2.

The method of the second embodiment begins with user 202 selecting a file and performing a non-default drag and drop at step 80. When files are transferred with a non-default drag and drop, the operating system 211 displays a context menu 205 containing various choices effecting the transfer. At this point, decisions based on the user's choice from the context menu determine whether a file association will be created. At decisional step 82, the operating system 211 determines whether the user has chosen to "twin" the selected file. As used herein the term "twin" means to create a copy of the selected file and to associate that copy with the selected file. If the user 202 has chosen to twin the selected file, the YES branch is taken from step 82. Proceeding along the YES branch of step 82, decisional step 84 is performed to determine if a file of the same name already exists at the drop location. The YES branch of step 84 leads to decisional step 86 which gives the user 202 the option of replacing the previously existing file with the selected file. If the user chooses not to replace the previously existing file at step 86, the method follows the NO branch of step 86, the transfer is aborted and no association of files occurs.

If user 202 chooses to replace the previously existing file at step 86, the YES branch of step 86 leads to step 88 where the selected file is copied to the drop location at step 88. Similarly, if a file having the same name as the selected file does not exist at the drop location back at step 84, the YES branch is followed to step 88 where the selected file is copied to the drop location. The selected file is hereinafter referred to as the "first twin file". The file copied to the drop location is hereinafter referred to as the "second twin file".

Next, at step 90 the first twin file and the second twin file are associated by storing the necessary information to link the files and to determine their synchronization status in the future. Particularly, at step 90, the name and paths of the first twin file and of the second twin file are stored into the global synchronization database 208. Also at step 90, the time-stamp of the first twin file and the time-stamp of the second twin file are stored into the global synchronization database 208 as the last reconciliation time-stamps of the files.

Figure 9B:
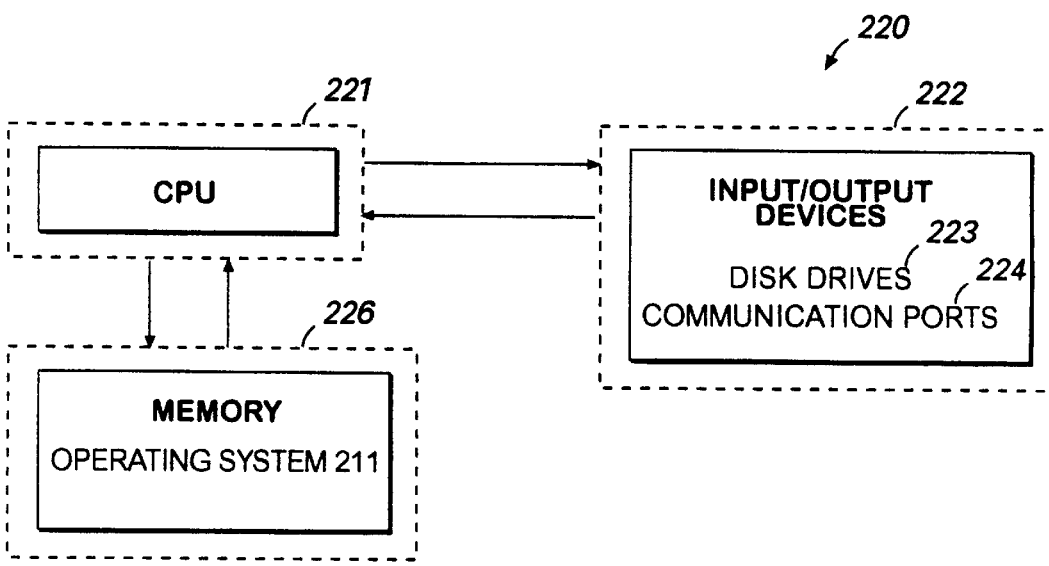
FIG. 9B is a diagrammatic view of the computing device used in connection with a second embodiment (twinning) for associating, synchronizing and reconciling files in accordance with the present invention.

FIG. 9B shows the system of the second embodiment (twinning) for associating files in computer operating system 211 having components and methods as shown in FIGS. 1B, 2 and 3B. Computing device 220 is operated by Central Processing Unit 221 (hereinafter "CPU"), which processes data from operating system 211. Operating system 211 resides in memory 226. CPU 221 additionally processes data from input/output devices 222, which may include disk drives for storage media 223 and/or communication ports 224.

Thus, the present invention includes two embodiments by which files may be associated. In the first embodiment, files are selected for association by transferring them into a dedicated folder (briefcase) which has a dedicated synchronization database for storing file association information. In the second embodiment of the present invention, files are selected for association (twinning) by selecting association action from a context menu during the transfer of the file. For this embodiment, a global synchronization database is used to store file association information relating to the twinned files.

Figure 4:
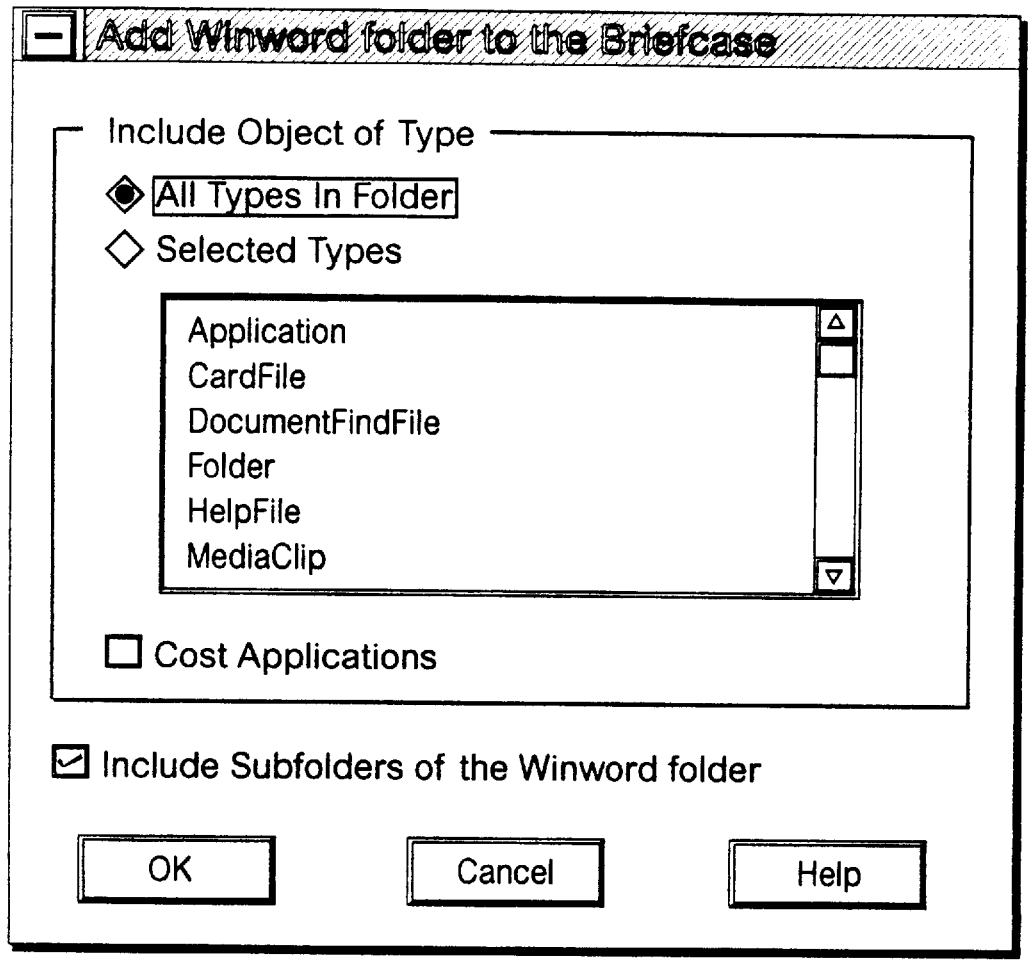
FIG. 4 is a user interface showing a file filter which may be used in connection with the present invention.

For both association embodiments, more than two files can be associated in an associated file set. The additional files are associated by the further association of a file that is already associated. Also in both association embodiments of the present invention, file folders as well as file documents may be associated for synchronization and reconciliation. As shown in FIG. 4, the preferred embodiment of the present invention provides a filter for situations where a folder, as opposed to a document, is associated. When a folder is associated, the filter allows the user to limit the type of documents in that folder that will be synchronized and reconciled. Use of the filter is optional. Thus, user 2 may use the filter when the folder is initially associated or at a later date.

Regardless of whether files are associated by the first or the second association embodiment, once associated, the associated file sets are synchronized and reconciled by the same method. For the sake of convenience, the terminology of the first embodiment (FIGS. 1A and 3A) will be used where different terms are used by the embodiments. Thus, the first twin file and the second twin file of the second embodiment will be respectively referred to as the briefcase file and the synchronized file in accordance with the first embodiment. Further, the dedicated synchronization database 8 of the first embodiment and the global synchronization database 208 of the second embodiment will together be referred to as the synchronization database. Additionally, although more than two files may be associated in accordance with the present invention, for the sake of convenience, the present invention is described with reference to an associated file set containing two files.

As shown in FIG. 5, the synchronization procedure begins with an updating event at step 100. Thus, associated files are synchronized every time an updating event occurs. In the preferred embodiment, the updating events are a user request and a docking event. A docking event occurs when a portable computer is mated or un-mated with an expansion bus, which allows the portable computer to interact with the peripheral devices that are hooked to the bus. Using a user request and a docking event to trigger synchronization is preferred because the associated files are synchronized in the situations they need to be, but not constantly which would degrade computer performance and annoy the user.

Next, at step 102, the name, paths and last reconciliation time-stamps of an associated file set are retrieved from the synchronization database 8 (FIG. 1A). At this point, the file modification information determines what synchronization status will be reported and what reconciliation action will be recommended.

Figure 6:
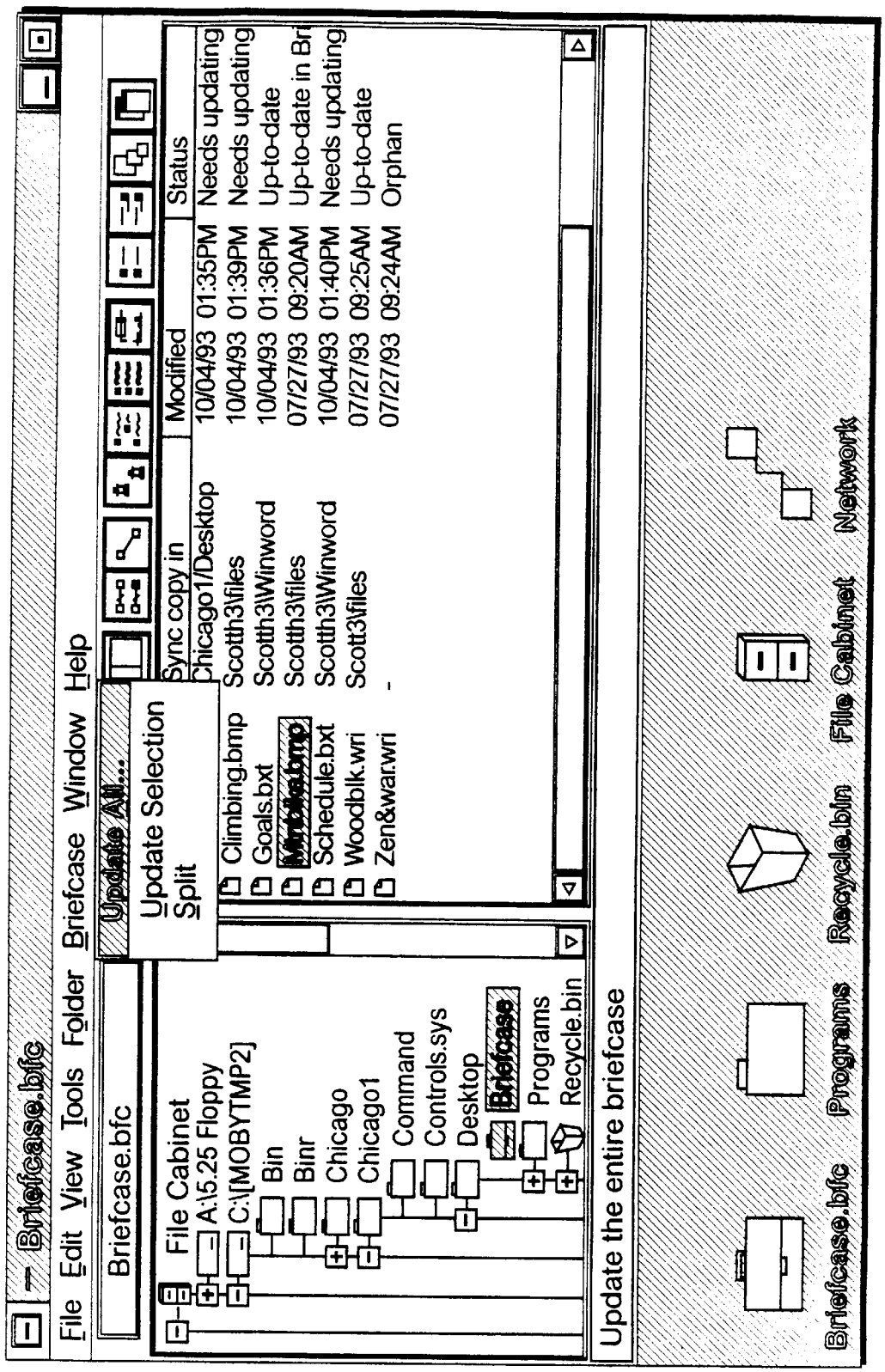
FIG. 6 is a user interface for the first embodiment of the present invention showing the opened dedicated folder (briefcase) for associating files.

At decisional step 104, the operating system 11 determines whether the storage media where the synchronized file is stored is available. If the storage media where the synchronized file is stored is available, the YES branch of step 104 leads to decisional step 105 where operating system 11 determines whether the synchronized file is available. The YES branch of step 105 leads to step 106 where the last reconciliation time-stamp of the briefcase file is compared with the current time-stamp of the briefcase file. If the time-stamps of the files are different, then file modification has occurred. Proceeding to decisional step 108, the operating system 11 determines whether the briefcase file has been modified. Following the NO branch to step 110, the last reconciliation time-stamp of the synchronized file is compared with the current time-stamp of the synchronized file. Further proceeding to decisional step 112, operating system 11 determines whether the synchronized file has been modified. Following the NO branch from step 112, the synchronization status is reported as "up-to-date" at step 114. If, however, the synchronized file has been modified at step 112, the YES branch leads to step 116 where the synchronization status is reported as "needs updating". FIG. 6 shows the reported synchronization status of associated file sets as displayed to user 2. Also at step 116, the reconciliation action for updating the briefcase file with the synchronized file is recommended because the synchronized file has been modified and the briefcase file is thus outdated. The recommended reconciliation action, as displayed to user 2, is shown by FIG. 6.

Returning to step 108, if the briefcase file has been modified, the YES branch leads to step 118 where the last reconciliation time-stamp of the synchronized file is compared with the current time-stamp of the synchronized file. Proceeding to decisional step 120, operating system 11 determines whether the synchronized file has also been modified. Following the NO branch from step 120, the synchronization status is reported as "needs updating". Also at step 122, the reconciliation action of replacing the synchronized file with the briefcase file is recommended because the briefcase file has been modified and the synchronized file is thus outdated.

If at step 120 the operating system 11 determines that the synchronized file has also been modified, the YES branch from step 120 leads to decisional step 124 where operating system 11 determines whether a reconciliation handler of the proper file type is available. Applications having a reconciliation handler register the reconciliation handlers by their extension with the operating system's registry database 18 (FIG. 1). If a reconciliation handler is available, the YES branch of step 124 leads to step 126 where the synchronization status is reported as "needs updating". Also at step 126, the reconciliation action of merging the synchronized file with the briefcase file is recommended. The NO branch of step 124 leads to step 128 where the synchronization status is reported as "needs updating". Due to the existence of a file conflict and absence of a reconciliation handler, however, no reconciliation action is recommended at step 128.

Proceeding from steps 114, 116, 122, 126 and 128 to decisional step 130 (FIG. 5), operating system 11 determines whether all associated file sets have been synchronized. If all associated file sets have not been synchronized, the NO branch of step 130 leads back to step 102 in order to initiate synchronization of the next associated file set. If all associated file sets have been synchronized, YES branch ends the synchronization process.

When an associated file set includes more than two associated files, modification of the additional files are determined in the same manner as are modification of first two associated files described above. Modification of the additional files are considered just as is the modification of the first two files in determining the synchronization status of an associated file set. For example, if the briefcase file and the third associated file have been independently modified, but the synchronized file has not been modified, a file conflict would still exist and would, if the third associated file is available, be reported. Similarly, if only the briefcase file has been modified, both the synchronized file and the third associated file would be outdated and need updating.

Returning to step 104, if the storage media where the synchronized file is stored is not available, the NO branch leads to step 131 where the last reconciliation time-stamp of the briefcase file is compared with the current time-stamp of the briefcase file. If the time-stamps of the files are different, then file modification has occurred. Proceeding to decisional step 132, the operating system 11 determines whether the briefcase file has been modified. The NO branch of decisional step 132 leads to step 134 where the synchronized file is reported as unavailable. The YES branch of decisional step 132 leads to step 133 where the synchronization status is reported as "needs updating".

At step 105, the NO branch leads to step 136 where the briefcase file (briefcase copy) is reported to be an orphan. Steps 133, 134 and 136 proceed to decisional step 130 where, as above-described, it is determined if all associated file sets have been synchronized.

When all of the associated file sets have been synchronized, the synchronization status having been determined by a comparison of file time-stamps, the synchronization status of the associated file sets are displayed to user 2 via user interface 4. At this point, user 2 may choose to reconcile the associated file sets.

Figure 7:
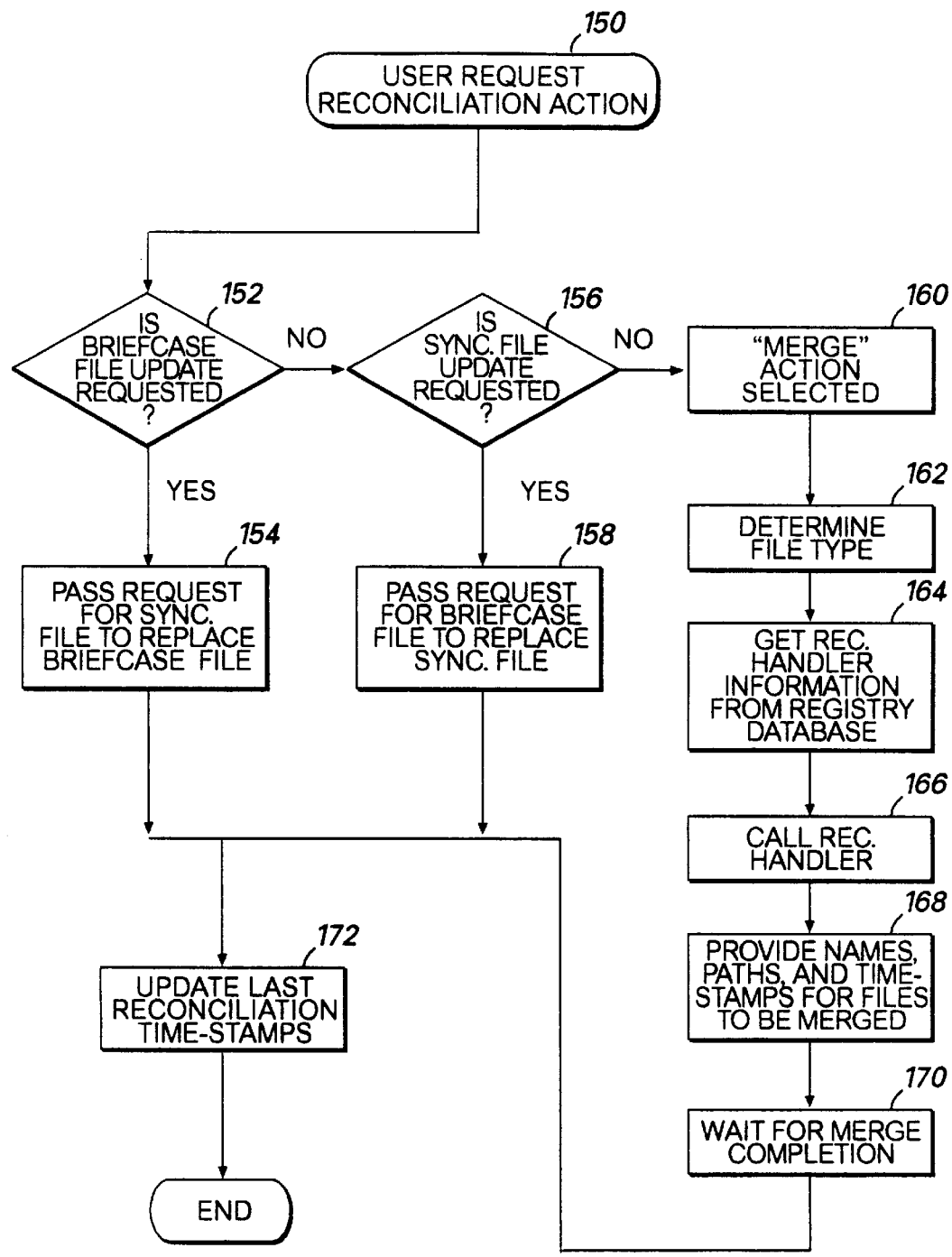
FIG. 7 is a logical flow diagram of the reconciliation component of FIG. 2 which may be used in connection with the present invention.
Figure 8:
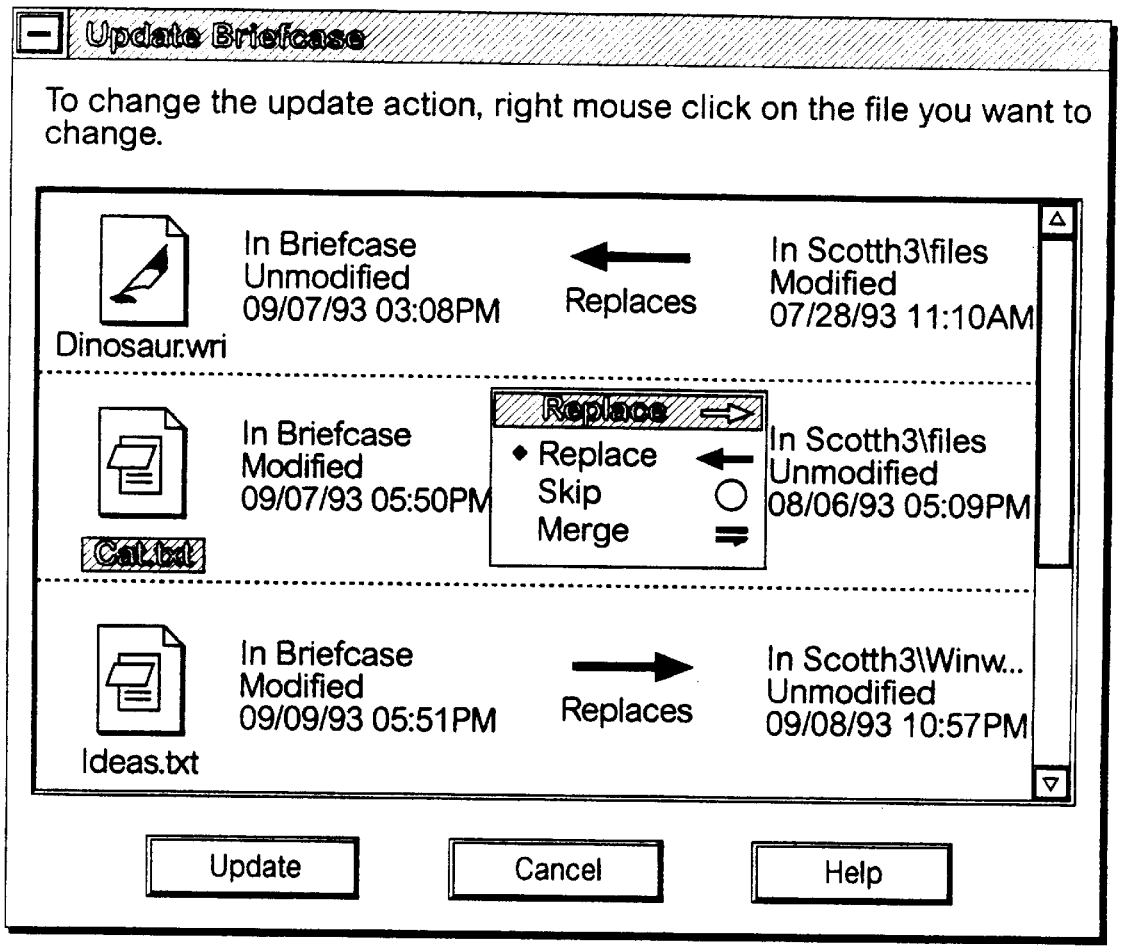
FIG. 8 is a user interface of the present invention showing the selection of reconciliation actions which may be used in connection with the present invention.

As shown in FIG. 7, the reconciliation procedure begins with a request for reconciliation from user 2 at step 150. FIG. 8 shows a computer screen presented to user 2 for requesting a reconciliation action. The information presented to user 2 by the screen includes the name, paths and time-stamps of the associated file sets, the recommended reconciliation actions of the associated file sets and the synchronization status of each associated file set. When user 2 selects a file from the screen, an on screen menu appears in order to allow the user to select a reconciliation action that is different than the recommended reconciliation action.

Proceeding to decisional step 152, operating system 11 determines whether the request is to update the briefcase file. The YES branch of step 152 leads to step 154, where the action of replacing the briefcase file with the synchronized file is passed to the file management component of the operating system 11. If the request is not to update the briefcase file, the NO branch leads to decisional step 156.

Step 156 determines if the request is to update the synchronized file. The YES branch of step 156 leads to step 158, where the action of replacing the synchronized file with the briefcase file is passed to the file management component of the operating system 11. If the request is not to update the synchronized file, the NO branch leads to step 160.

When more than two files are associated, as discussed above, the synchronization status of the associated file set is determined in reference to the additional files as well as in reference to the first two associated files. Thus, the synchronization status of the additional files, if available, are displayed and the user may request to reconcile them just as the user would request to reconcile the first two associated files described above.

Step 160 is the remaining reconciliation action of merge. Proceeding to step 162, the associated file type is determined. Next, information to call the reconciliation handler is retrieved from the operating system's registry database 18 (FIG. 1) at step 164. At step 166, the reconciliation handler is called to merge the associated file set and provided the name, paths and time-stamps of the files to be merged at step 168. If more than two files of an associated file set have been independently modified, they may all be merged by the same method by providing the paths and time-stamps of the additional files as well. Upon merge completion at step 170, the last reconciliation time-stamp is updated in the synchronization database 8 at step 172. Steps 154 and 158 also lead to step 172 where the last reconciliation time-stamp in the synchronization database 8 is updated.

From the foregoing description of the preferred embodiments and the several alternatives, other alternative constructions of the present invention may suggest themselves to those skilled in the art. Therefore, the scope of the present invention is to be limited only by the claims below and equivalents thereof.

We claim:

1. A method of associating files in a computing device having an operating system wherein each file in the computing device is identified by a name, characterized by a time-stamp denoting the last time the file was updated, and located on a storage device by a path, comprising the steps of:
    (a) transferring a selected file;
    (b) determining if the transfer of the selected file was into a dedicated folder; and
    (c) if the transfer of the selected file was into the dedicated folder;
        (1) creating a briefcase file of the selected file, the briefcase file being a copy of the selected file and having a name and a time-stamp the same as the name and the time-stamp, respectively, of the selected file, and designating the selected file as a synchronized file; and
        (2) storing a last reconciliation time-stamp, the name, time-stamp and the paths of the briefcase file and of the synchronized file into a dedicated synchronization database, wherein the time-stamp being a last reconciliation time-stamp is equal to the time-stamp of the briefcase file, and wherein all files of the same name in the synchronization database are thereby associated to form an associated file set.

2. A method of associating files in a computing device as recited in claim 1 further comprising the steps of:
    (d) determining if the transfer of the selected file was from the dedicated folder; and
    (e) if the transfer of the selected file was from the dedicated folder, determining if the dedicated folder is on a removable storage media;
        (1) if the dedicated folder is on removable storage media;
            (A) creating a synchronized file of the selected file, the synchronized file being a copy of the selected file having a name and a time-stamp the same as the name and the time-stamp respectively of the selected file, and designating the selected file as a briefcase file;
            (B) storing a last reconciliation time-stamp, the name and the paths of the briefcase file and of the synchronized file into a dedicated synchronization database, wherein the last reconciliation time-stamp is equal to the time-stamp of the synchronized file, and wherein all files of the same name in the synchronization database are thereby associated to form an associated file set; and
        (2) if the dedicated folder is not on a removable storage media:
            (A) moving the selected file to a drop location; and
            (B) deleting the name, the last reconciliation time-stamp and the paths of the briefcase and the selected file from the dedicated synchronization database.

3. A method of associating files in a computing device as recited in claim 1 wherein the file selection occurs through a graphical user interface.

4. A method of enabling the replacing of files in a computer system having an operating system, wherein each file in the computing device is identified by a name, characterized by a time-stamp denoting the last time the file was updated, and located on a storage device by a path, comprising the steps of:
    (a) receiving information that a selected one of a plurality of computer applications, each having an application type, is associated with a corresponding reconciliation handler,
    (b) storing the application type of the selected computer application in a registry database,
    (c) storing call information of the corresponding reconciliation handler for the selected computer application in the registry database,
    (d) detecting a request to replace files of the application type for the selected computer application,
    (e) retrieving the call information of the corresponding reconciliation handler from the registry database,
    (f) calling the selected computer application to activate the corresponding reconciliation handler, and
    (g) providing the name, paths and time-stamps of the files to a reconciliation handler interface.

5. A method of enabling the replacing of files in a computing device as recited in claim 4 further comprising the step of passing progress messages from the corresponding reconciliation handler to the operating system through the reconciliation handler interface.

6. A computer system for associating files in a computing device, comprising:
    (a) an operating system wherein each file in the computing device is identified by a name, characterized by a time-stamp denoting the last time the file was updated, and located on a storage device by a path;
    (b) a dedicated folder for receiving a copy of a selected file, the selected file being designated as a synchronized file and the copy in the dedicated folder being designated as a briefcase file;
    (c) a dedicated synchronization database for storing a last reconciliation time-stamp, the name and the paths of the briefcase file and of the synchronized file; and
    (d) an association engine for determining which files have the same name in the dedicated synchronization database and are thereby associated to form an associated file set.

7. A computer system for associating and reporting the state of synchronization of files in a computing device comprising:
    (a) an operating system wherein each file in the computing device is identified by a name, characterized by a time-stamp denoting the last time the file was updated, and located on a storage device by a path;
    (b) a dedicated folder for receiving a copy of a selected file, the selected file being designated as a synchronized file and the copy in the dedicated folder being designated as a briefcase file;
    (c) a dedicated synchronization database for storing a last reconciliation time-stamp, the name and the paths of the briefcase file and of the synchronized file;
    (d) an association engine for determining which files have the same name in the dedicated synchronization database and are thereby associated to form an associated file set; and (e) a synchronization engine for:
  (1) determining a synchronization status of the associated file set upon an updating event by determining if the briefcase file has been modified and by determining if the synchronized file has been modified; and
  (2) reporting the synchronization status of the associated file set.

8. A computer system for associating and reporting the state of synchronization of files in a computing device as recited in claim 7 further comprising a file system for storing the current time-stamps of files in the computing device, wherein the synchronization engine determines if the briefcase file has been modified by comparing the current time-stamp of the briefcase file in the file system with the last reconciliation time-stamp in the synchronization database and determines if the synchronized file has been modified by comparing the current time-stamp of the synchronized file in the file system with the last reconciliation time-stamp in the dedicated synchronization database.

9. A computer system for associating, synchronizing and reconciling files in a computing device comprising:
  (a) an operating system wherein the operating system is capable of recognizing a plurality of application types, and wherein each file in the computing device is identified by a name, characterized by a time-stamp denoting the last time the file was updated, typed by an application type associated with the file, and located on a storage device by a path;
  (b) a dedicated folder for receiving a copy of a selected file, the selected file designated as a synchronized file and the copy in the dedicated folder designated as a briefcase file;
  (c) a dedicated synchronization database for storing a last reconciliation time-stamp, the name and the paths of the briefcase file and of the synchronized file;
  (d) an association engine for determining which files have the same name in the dedicated synchronization database and are thereby associated to form an associated file set; and
  (e) a synchronization engine for:
    (1) determining a synchronization status of the associated file set upon an updating event by determining if the briefcase file has been modified and by determining if the synchronized file has been modified; and
    (2) reporting the synchronization status of the associated file set;
  (f) a file manager for:
    (1) recommending the synchronized file be replaced by the briefcase file if only the briefcase file has been modified; and
    (2) recommending the briefcase file be replaced by the synchronization file if only the synchronized file has been modified;
  (g) a registry database for:
    (1) listing a plurality of reconciliation handlers by application type; and
    (2) storing call information for each of the plurality of reconciliation handlers; and
  (h) a reconciliation handler interface for replacing files by:
    (1) receiving a request to replace files; and
    (2) calling one of the plurality of reconciliation handlers.

10. An interface for replacing files in a computing device comprising:
  (a) a registry database for:
    (1) listing a plurality of reconciliation handlers, each corresponding to one of a plurality of application programs having an application type, each reconciliation handler listed in the registry database by the application type for the corresponding application program; and
    (2) storing call information for each of the plurality of reconciliation handlers; and
  (b) a reconciliation handler interface for replacing files by:
    (1) receiving a request to replace files; and
    (2) calling a selected one of the application programs to activate its corresponding one of the plurality of reconciliation handlers.

11. An interface for replacing files in a computing device as recited in claim 10 wherein the reconciliation handler interface is further available for passing progress messages from the corresponding one of the reconciliation handlers to the computing device.

12. A method of determining the status of synchronization of files in a computing device having an operating system, wherein each file in the computing device is identified by a name, characterized by a time-stamp denoting the last time the file was updated, and located on a storage device by a path, comprising the steps of:
  (a) creating a dedicated folder for maintaining an associated set of files;
  (b) in response to moving a selected one of tie files into the dedicated folder, creating a briefcase file representing a copy of the selected file;
  (c) retrieving from a dedicated synchronization database the name and the path of the briefcase file, and a last reconciliation time-stamp;
  (d) getting the time-stamp of the briefcase file; and
  (e) comparing the time-stamp of the briefcase file with the last reconciliation time-stamp.

13. A method of recommending a reconciling action for conflicting files in a computing device having an operating system, wherein each file in the computing device is identified by a name, characterized by a time-stamp denoting the last time the file was updated, and located on a storage device by a path, comprising the steps of:
  (a) creating a dedicated folder for maintaining an associated set of files;
  (b) in response to moving a selected one of the files into the dedicated folder, creating a briefcase file representing a copy of the selected file and designating the selected files as a synchronized file;
  (c) if neither the briefcase file nor the synchronized file has been modified, recommending no reconciliation action;
  (d) if only the briefcase file has been modified, recommending the synchronized file be replaced by the briefcase file;
  (e) if only the synchronized file has been modified, recommending the briefcase file be replaced by the synchronized file; and
  (f) if both the briefcase file and the synchronized file have been modified, reporting that a file conflict exists between the briefcase file and the synchronized file.

14. A method of recommending a reconciling action for conflicting files in a computing device as recited in claim 13 wherein if the file conflict exists, recommending that the briefcase file and the synchronization file be merged.

15. A method of recommending a reconciling action for conflicting files in a computing device as recited in claim 14 further comprising the steps of:
   (g) if an update request for the briefcase file is received, passing the update request to a file manager;
   (h) if an update request for the synchronized file is received, passing the update request to the file manager; and
   (i) if a merge request for the briefcase file and the synchronized file is received, passing the merge request to a reconciliation handler interface.

16. A method of recommending a reconciling action for conflicting files in a computing device as recited in claim 13 wherein if the file conflict exists:
   (g) determining if a particular one of a plurality of reconciliation handlers corresponding to one of a plurality of application programs having an application type associated with the associated set of files is available; and
   (h) if the particular reconciliation handler is available, recommending that the briefcase file and the synchronization file be merged.

17. A method of recommending a reconciling action for conflicting files in a computing device as recited in claim 16 wherein the availability of the reconciliation handler is determined by examining whether the application type of the associated file set is listed in a registry database as having the particular reconciliation handler.

18. A method of recommending a reconciling action for conflicting files in a computing device as recited in claim 16 wherein the merge request is passed to a reconciliation handler interface by calling the reconciliation handler and by providing the name, the time-stamps and the paths of the briefcase file and of the synchronized file to the reconciliation handler interface.

19. A computer-readable medium on which is stored a computer program for providing a method of associating files in a computing device having an operating system, wherein each file in the computing device is identified by a name, characterized by a time-stamp denoting the last time the file was updated, and located on a storage device by a path, said computer program comprising instructions which, when executed by a computer, perform the steps of:
   (a) transferring a selected file;
   (b) determining if the transfer of the selected file was into a dedicated folder; and
   (c) if the transfer of the selected file was into the dedicated folder;
      (1) creating a briefcase file of the selected file, the briefcase file being a copy of the selected file and having a name and a time-stamp the same as the name and the time-stamp, respectively, of the selected file, and designating the selected file as a synchronized file; and
      (2) storing a last reconciliation time-stamp, the name and the paths of the briefcase file and of the synchronized file into a dedicated synchronization database, wherein the last reconciliation time-stamp is equal to the time-stamp of the briefcase file, and wherein all files of the same name in the dedicated synchronization database are thereby associated to form an associated file set.

20. The computer-readable medium of claim 19, wherein said steps performed by said instructions further comprise the steps of:
   (d) determining if the transfer of the selected file was from the dedicated folder; and
   (e) if the transfer of the selected file was from the dedicated folder, determining if the dedicated folder is on a removable storage media;
      (1) if the dedicated folder is on removable storage media;
         (A) creating a synchronized file of the selected file, the synchronized file being a copy of the selected file having a name and a time-stamp the same as the name and the time-stamp, respectively, of the selected file, and designating the selected file as a briefcase file;
         (B) storing a last reconciliation time-stamp, the name and the paths of the briefcase file and of the synchronized file into a dedicated synchronization database, wherein the last reconciliation time-stamp is equal to the time-stamp of the synchronized file, and wherein all files of the same name in the dedicated synchronization database are thereby associated to form an associated file set; and
      (2) if the dedicated folder is not on a removable storage media;
         (A) moving the selected file to a drop location; and
         (B) deleting the name, the last reconciliation time-stamp and the paths of the briefcase and the selected file from the dedicated synchronization database.

21. The computer-readable medium of claim 19, wherein the file selection occurs through a graphical user interface.

22. A computer-readable medium on which is stored a computer program for providing a method of enabling the updating of files in a computer system having an operating system, wherein each file in the computing device is identified by a name, characterized by a time-stamp denoting the last time the file was updated, and located on a storage device by a path, said computer program comprising instructions which, when executed by a computer, perform the steps of:
   (a) receiving information that a selected one of a plurality of computer applications, each having an application type, is associated with a corresponding reconciliation handler,
   (b) storing the application type of the selected computer application in a registry database,
   (c) storing call information of the corresponding reconciliation handler for the selected computer application in the registry database,
   (d) detecting a request to replace files of the application type for the selected computer application,
   (e) retrieving the call information of the corresponding reconciliation handler from the registry database,
   (f) calling the selected computer application to activate its corresponding reconciliation handler, and
   (g) providing the name, paths and time-stamps of the files to a reconciliation handler interface.

23. The computer-readable medium of claim 22, wherein said steps performed by said instructions further comprise the step of passing progress messages from the reconciliation handler to the operating system through the corresponding reconciliation handler interface.

* * * * *

UNITED STATES PATENT AND TRADEMARK OFFICE
CERTIFICATE OF CORRECTION

PATENT NO. : 5,845,293
DATED : December 1, 1998
INVENTOR(S) : Veghte, et. al.

Figure 5B:
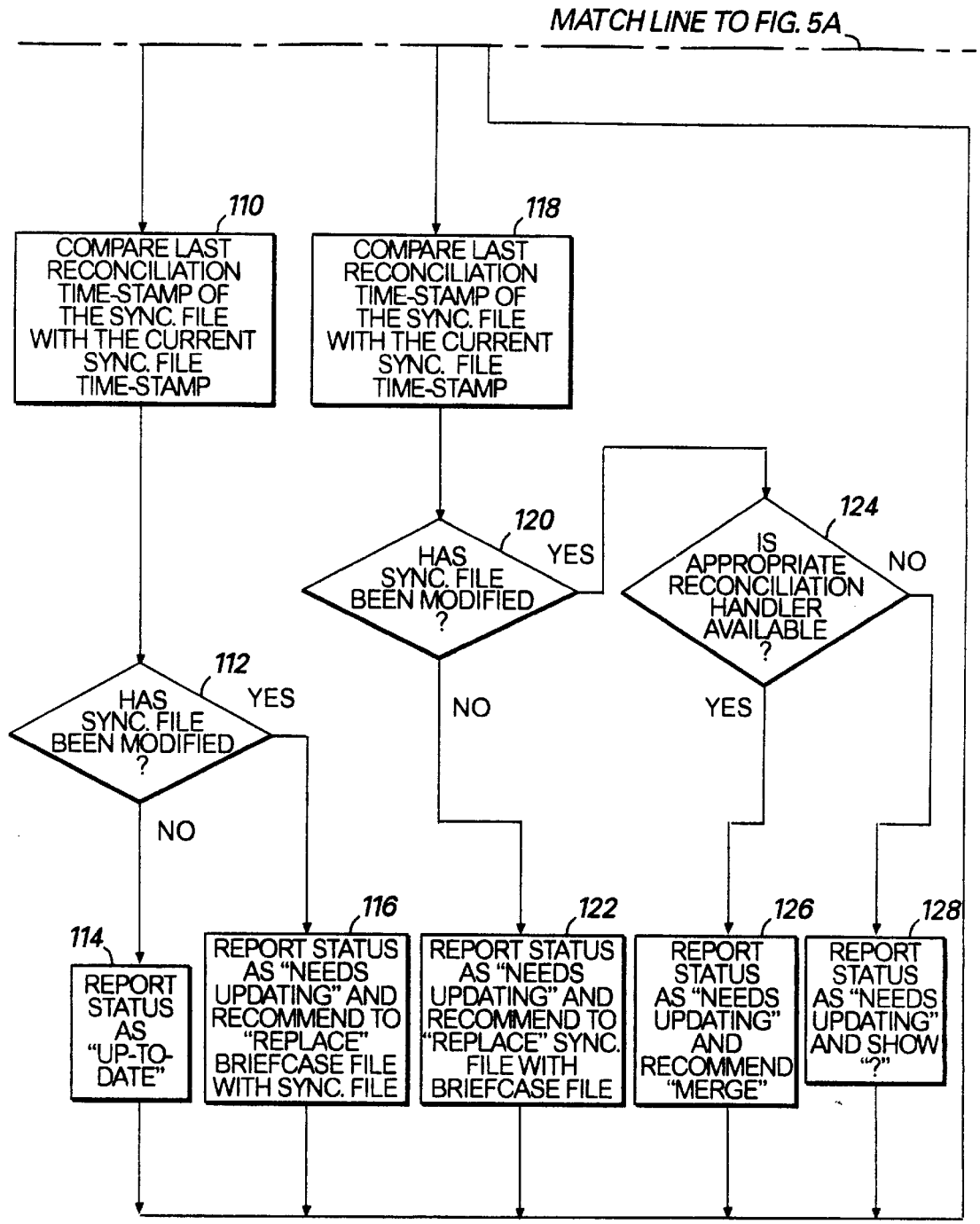
FIG. 5 is a logical flow diagram of the synchronization component of FIG. 2 which may be used in connection with the present invention.

It is certified that error appears in the above-identified patent and that said Letters Patent is hereby corrected as shown below:

Column 5, line 29, after "FIG. 5" insert --, consisting of FIGS. 5A and 5B,--.

Column 10, line 40, after "FIG. 5," insert --consisting of FIGS. 5A and 5B,--.

Column 11, line 50, replace "(FIG. 5)" with --(FIG. 5A)--.

Signed and Sealed this

Ninth Day of March, 1999

Attest:

Q. TODD DICKINSON

Attesting Officer

Acting Commissioner of Patents and Trademarks